United States Patent
Eichinger

[11] 3,811,174
[45] May 21, 1974

[54] METHOD OF ASSEMBLING CLOSURE MEMBER FOR METAL CONTAINERS

[75] Inventor: John W. Eichinger, Sharpsville, Pa.

[73] Assignee: Buckeye Forge Division - Gulf & Western Industrial Products Company, Grand Rapids, Mich.

[22] Filed: Feb. 1, 1973

[21] Appl. No.: 328,533

Related U.S. Application Data

[62] Division of Ser. No. 107,165, Jan. 18, 1971, Pat. No. 3,757,986.

[52] U.S. Cl............... 29/453, 29/453, 29/458, 113/121 E
[51] Int. Cl............................................. B23p 11/02
[58] Field of Search........... 29/453, 458; 113/121 C, 113/121 E; 220/39 R, 39 B

[56] References Cited
UNITED STATES PATENTS

| | | | |
|---|---|---|---|
| 2,194,147 | 3/1940 | Mauser | 220/39 B |
| 2,900,103 | 8/1959 | Taylor et al. | 220/39 R |
| 2,916,311 | 12/1959 | Keplinger | 220/39 R X |
| 3,342,366 | 9/1967 | Defauw | 113/121 E X |
| 3,468,013 | 9/1969 | Sciamonte et al. | 29/453 X |
| 3,684,125 | 8/1972 | Laurizio | 220/39 R X |

Primary Examiner—Charlie T. Moon
Attorney, Agent, or Firm—Donnelly, Maky, Renner & Otto

[57] ABSTRACT

A closure member for a metal container comprising a plastic sleeve member or spud snapped into an opening in the metal container and a plastic plug removably received within the sleeve member. The sleeve member or flange has a radially projecting shoulder at one end which extends into an annular groove in an embossment on the metal container surrounding the opening therein. During insertion of the sleeve member or flange into the container opening, the radial shoulder is bent radially inwardly by the smaller diameter surface of the embossment adjacent the annular groove therein to permit movement of the radial shoulder therepast, after which the radial shoulder returns to its original shape where it is confined within the annular groove, locking the sleeve member in place. An axially and radially inwardly tapered lip on the embossment overlies the radial shoulder on the sleeve member providing a tapered bearing and sealing surface for sealing engagement by an annular shoulder on the plug when tightened in the sleeve member.

3 Claims, 7 Drawing Figures

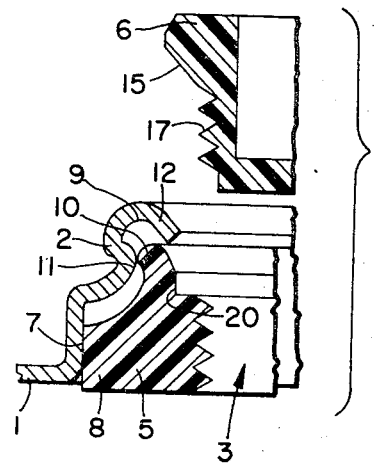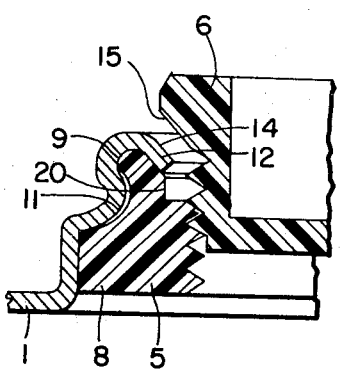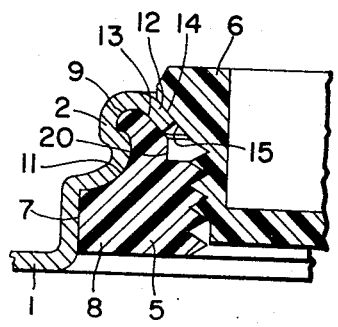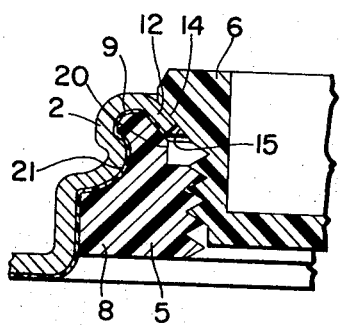

METHOD OF ASSEMBLING CLOSURE MEMBER FOR METAL CONTAINERS

This is a division of application Ser. No. 107,165, filed Jan. 18, 1971, now U.S. Pat. No. 3,757,986.

BACKGROUND OF THE INVENTION

This invention relates generally as indicated to a closure member for metal containers and method of assembly which eliminates the use of retaining rings or other metal parts for retaining the closure member in place, and does not require any secondary or progressive metal forming operations during assembly. Nor are any gaskets required to provide an effective seal between the closure parts and metal container.

Heretofore, it was the usual practice to provide standard shipping and other metal containers, particularly those ranging in size from 15 gallons to 55 gallons in capacity, with metal closures consisting of a metal plug equipped with a separate gasket and a metal flange or spud which was mechanically retained in an opening in the metal container for receipt of the metal plug. To assemble the metal flange in the drum opening usually required a pressing operation during which both the metal of the drum and flange were formed, resulting in increased manufacturing costs. Separate gaskets were also required to obtain an effective seal between the metal tank and flange and also between the flange and plug when fully assembled therein.

Another difficulty with metal closures was that oftentimes they were subject to chemical attack by the contents of the container and/or caused contamination of the container contents. Although it was common practice to coat the metal closure parts with organic protective coatings such as are used to line the interior of the container, in some instances the metal flange is assembled in the container opening prior to coating the interior of the drum, leaving the interior metal surface under the closure flange and around it uncoated. Moreover, repeated removal and re-insertion of the coated metal plug into the coated metal flange or spud causes the coating to be removed from the threads leaving bare metal exposed to the contents of the drum. A large number of coatings are also in demand, necessitating a large inventory of closure parts with different types of coatings applied at increased costs.

Several types of plastic closures have been used for shipping containers and the like which eliminate some of the problems inherent in using coated metal closure parts. However, they still generally require special seals for making the closures fluid tight, and metal retaining rings and crimping and clinching tools are also usually required to attach the closures to the containers. The plastics used for the closure parts were also usually subject to damage by the elevated temperatures encountered in paint drying ovens for most container fabricating operations, making it necessary to use a temporary cover during the paint drying operation which had to be later removed and the regular cover substituted in its place at additional manufacturing costs. At present none of the soft resilient plastic materials from which the plastic closures were heretofore made to allow adequate compression by the crimping tools to effect the desired seal will withstand the elevated paint drying temperatures.

SUMMARY OF THE INVENTION

With the foregoing in mind, it is a principal object of this invention to provide a closure member for metal containers and method of assembly which does not require any special retaining rings or forming or crimping operations to secure the closure member in place.

Another object is to provide such a closure member which maintains an adequate seal against fluid leakage without the use of gaskets.

Still another object is to provide such a closure member which is not subject to attack by the contents of the container and will not contaminate the container contents.

Yet another object is to provide such a closure member which may be attached to the metal container after the container interior has been fully lined with a suitable protective coating.

A further object is to provide such a closure member which is less expensive to manufacture than previous known coated metal closure members and has a high resistance to chemical attack by the container contents which is unaffected by the number of times the closure member may be opened or closed.

A further object is to provide such a closure member which is made of a plastic material resistant to chemical attack by most fluids, thereby eliminating the need for having to maintain an inventory of closure members of different plastic materials.

Yet another object is to provide such a closure member which may be removed from the container and a new closure member inserted in its place during reconditioning of the container as desired.

Briefly, the closure member of the present invention consists of a plastic sleeve member or spud provided with a radially projecting shoulder at one end for receipt in an annular internal groove in an embossment on the metal container surrounding the opening therein, and a plastic plug for receipt in the plastic sleeve member. During insertion of the sleeve member into the opening, the radial shoulder is bent radially inwardly by the smaller diameter surface of the embossment adjacent the annular groove to permit the radial shoulder to be forced past the smaller diameter surface and into the annular groove where it returns to its original diameter, locking the sleeve member in place. The embossment also has an inwardly and downwardly turned lip overlying the radial shoulder on the sleeve member which provides a tapered bearing and sealing surface for an annular shoulder on the plastic plug when fully inserted into the sleeve member. During tightening of the plug in the sleeve member, a sealing tension is created by the elongation of both the sleeve member and plug which maintains adequate pressure or tension to provide an effective seal between the plug and inturned lip and also between the base of the sleeve member and a shoulder on the embossment.

The closure member may be inserted in the container opening after coating the container interior so as not to interfere with the coating operation, and the closure member may be made of a plastic capable of withstanding the high temperatures incurred when the container is placed in the paint drying oven to permit attachment of the closure member within the container opening prior to the painting operation.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIGS. 4 through 6 are enlarged fragmentary sections through the closure member and metal container showing progressively the manner of assembly of the closure member in the container opening; and FIG. 7 is an enlarged fragmentary vertical section similar to FIG. 6 but showing the closure member assembled in a modified form of metal container provided with a protective lining on the interior surface thereof.

DESCRIPTION OF THE PREFERRED EMBODIMENT

Figure 1:
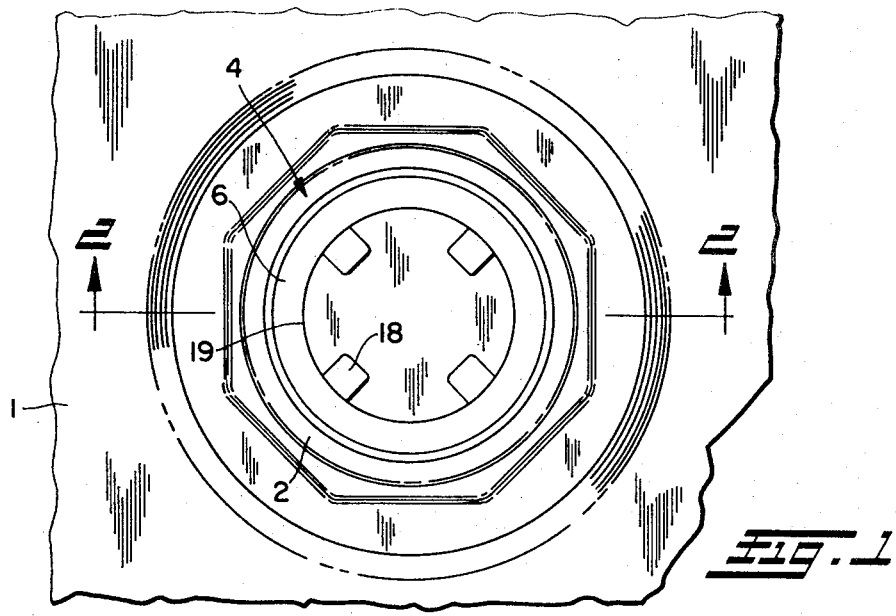
FIG. 1 is a fragmentary top plan view of a metal container having an opening therein in which is inserted a preferred form of closure member constructed in accordance with this invention.
Figure 2:
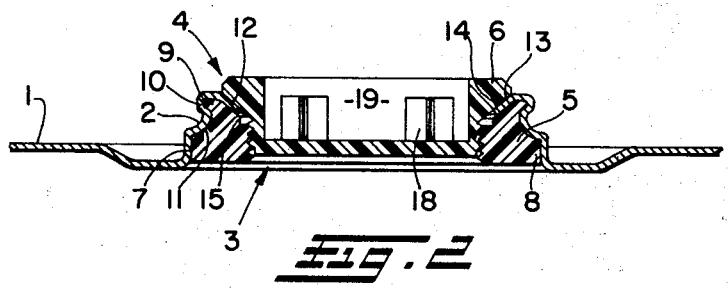
FIG. 2 is a vertical section through the closure member of FIG. 1 taken on the plane of the line 2—2 thereof.
Figure 3:
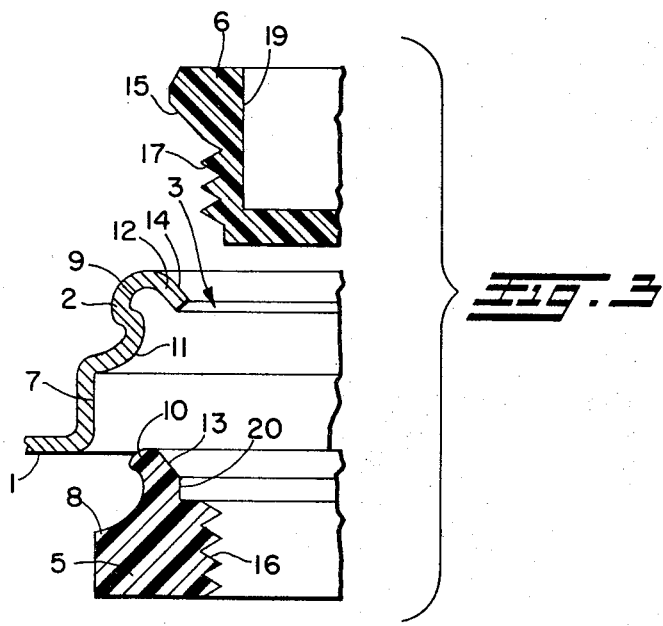
FIG. 3 is an enlarged exploded fragmentary vertical section of the closure member of FIG. 2 showing the sleeve member and plug in disassembled form prior to assembly within the container opening.

Referring now in detail to the drawings and first especially to FIGS. 1 and 2, there is shown a portion of one end or head of a metal container 1 which may be a shipping container, commonly referred to in the trade as a drum or barrel and usually ranging in size from 15 gallons to 55 gallons. Formed in the container end portion 1 is an outwardly projecting embossment 2 having an opening 3 therein for filling and emptying the container as desired. To prevent spillage of the contents of the container 1 when filled or partially filled, a closure member 4 is provided for the container opening 3 which consists of a sleeve member or flange 5 adapted to be securely mounted within the container opening 3 and a plug 6 which may be inserted into the sleeve member 5 and removed therefrom in a manner to be fully explained hereafter.

Referring further to FIGS. 1 and 2 and also to FIGS. 3 through 6, the embossment 2 is shaped to provide a hexagonal or other non-circular shaped recess 7 adjacent the container interior for receipt of a correspondingly shaped radial flange portion 8 on the inner end of the sleeve member or flange 5 to retain the flange against rotation. Axially outwardly of the recess 7 there is an inwardly opening annular groove 9 in the embossment 2 which receives a narrow radially outwardly projecting flange portion 10 on the axial outer end of the sleeve member 5.

With the sleeve member 5 fully assembled within the embossment 2 as shown in FIG. 2, removal of the sleeve member from the embossment is prevented by the outer flange portion 10 which extends into the annular groove 9 and is of a larger diameter than the annular shoulder or rib 11 on the embossment between the recess 7 and annular groove 9. The axial outer wall 12 of the annular groove 9 extends radially and axially inwardly in overlying relation to the correspondingly shaped outer tapered surface 13 on the outer flange portion 10 thus providing an inwardly turned annular lip 14 for engagement by a tapered shoulder 15 on the plug 6 when inserted into the central opening 16 in the sleeve member. Preferably, both the wall of the central opening 16 in the sleeve member 5 and the exterior surface 17 of the plug 6 are threaded to facilitate tightening of the plug within the sleeve member and removal therefrom. Moreover, plural lugs 18 are desirably provided within a recess 19 in the outer end of the plug 6 as shown in FIGS. 1 and 2 for engagement by a suitable wrench to facilitate tightening and loosening of the plug 6 in known manner.

Both the sleeve member 5 and plug 6 are made of a suitable plastic material that has sufficient resiliency to form an adequate and permanent seal between the plug shoulder 15 and annular lip 14 without the necessity of having to use a separate gasket therebetween. In actual practice, it has been found that acetal resin such as manufactured by Celanese Plastics Company under the trademark CELCON has sufficient resiliency to accomplish the desired sealing and also has adequate fatigue, tensile, and impact strength to meet the necessary requirements for use in the field.

With the closure parts 5 and 6 made of such a plastic resin material, when the plug 6 is screwed tightly into the sleeve member opening 16, a sealing tension is created by the elongation of both the sleeve member and plug which forms a dual seal, one at the juncture of the plug shoulder 15 and the container lip 14, and the other at the axial outer end of the inner flange portion 8 on the sleeve member where it is drawn up against the inner surface of the metal embossment 2. Such elongation of the sleeve member 5 and plug 6 is sufficient to maintain adequate pressure or tension for obtaining an effective seal without the use of gaskets until relieved by loosening of the plug. A counterbore 20 may be provided in the outer end of the sleeve member opening 16 as shown or the plug 6 may be undercut beneath the plug shoulder 15 to ensure proper seating of the plug shoulder with the inturned lip 12.

Using acetal resin for the closure member parts also has the advantage that it will withstand the elevated temperatures encountered in paint drying ovens for most container fabricating operations. Heretofore, the plastic materials used in previous known combination plastic-metal closures were soft resilient materials capable of compression by crimping tools to effect a seal and would not withstand these high temperatures, making it necessary to use temporary covers on the drum openings which had to be removed after the paint drying operation and the combination plastic-metal closures substituted in their place at additional manufacturing costs.

Another advantage in using acetal or other resin of similar properties for the closure members is that it will resist chemical attack by most liquids and will not contaminate most liquids to the same degree or greater than the majority of protective coatings presently used to line the interior of shipping containers. Accordingly, there is no ned to coat the closure member parts 5 and 6 of the subject invention, as is usually required when the closure member parts are made of metal. Not only does this make the closure member parts of the subject invention less expensive than coated metal closure parts; there is no chance of the plastic coming off of the threads upon repeated removal and reinsertion of the plug leaving bare metal exposed to the contents of the drum, as there is with coated metal parts.

Assembly of the sleeve member 5 within the metal embossment 2 may be accomplished at any location convenient in the drum fabricating line prior to final assembly of the top and bottom of the drum to the shell by forcing and thus snapping the sleeve member into the embossment using an air tool or other suitable means. During such assembly, the outer flange 10 on the sleeve member 5 is bent or deformed radially inwardly by engagement with the annular shoulder 11 on the embossment as shown in FIG. 4 to permit insertion of the outer flange 10 past the annular shoulder. When the outer flange 10 clears the annular shoulder the outer flange is free to return to its original shape within the confines of the annular groove 9, thus locking the sleeve member in place.

The outer edge of the outer flange portion 10 may be rounded as shown to facilitate camming in of the flange portion as it is inserted past the annular shoulder 11.

If the metal container 1 is to be interior lined with a plastic lining 21 as shown in FIG. 7, the metal embossment 2 may be formed on the container prior to applying the plastic coating and the sleeve member 5 may be inserted afterwards so that the entire inner surface of the container may be lined. Where metal closures are used, the metal sleeve members of flanges are oftentimes inserted prior to coating the interior of the container, leaving the interior metal surface under the sleeve members and around them uncoated. Moreover, as previously explained making the closure member parts of plastic eliminates the need for having to provide them with a protective coating.

Not only are the plastic parts less expensive to manufacture than most coated metal parts, there is no danger that repeated removal and reinsertion of the plug of the plastic closure member will adversely affect chemical resistance of the closure member as is oftentimes the case when coated metal parts are used. Even one insertion of a coated metal plug may result in removal of the coating from the threads, leaving bare metal exposed to the action of the contents of the drum or contamination of the contents by the bare metal threads. There is also the disadvantage that when coated metal parts are used, the manufacturer must carry a large inventory of closure parts with different types of coatings, since there are quite a few different types of coatings in demand. When the closure parts are made out of plastic, this problem is non-existent since the plastic selected has the necessary resistance to chemical attack by most liquids.

A still further advantage of the plastic closure member of the present invention is that it may effectively be used in the reconditioning of drums or containers to eliminate the need for having to replace the drum head. Heretofore, if the drum head had a metal closure sealed with gaskets, the gaskets were frequently destroyed during the reconditioning process when the drum was cleaned of the residue of its original contents using an open flame or a highly caustic or alkaline material. If the reconditioner did not supply a new drum head and the closure leaked, further repairs were required at additional cost.

Moreover, many reconditioned drums which are converted to removable drum head containers from tight head drums are specified with a threaded opening in the head which also usually required the use of a new drum head. However, if the drums to be reconditioned are provided with plastic closure members in accordance with the present invention, the closure member may either be burned out or driven out of the drum head with suitable force and a new closure member installed by the same process previously described thus eliminating the need for a new drum head.

From the foregoing, it will now be seen that the closure member of the present invention is of a relatively simple and inexpensive design which may readily be assembled without having to perform any metal forming or crimping operations, and no special retaining rings are required to secure the closure member in place. Nor is any gasketing required for establishing a fluid-tight seal, and no coating is required for the closure member parts to resist chemical attack by the container contents or avoid contamination of the container contents.

I, therefore, particularly point out and distinctly claim as my invention:

1. A method of assembly of a closure member in an opening in a metal container comprising the steps of providing an embossment on such container around such opening therein, such embossment being provided with a non-circular recess adjacent the interior of the container and an internal annular groove outwardly of the recess, providing a plastic sleeve member for insertion into such embossment, such plastic sleeve member being provided with a non-circular flange portion on one end for receipt in the non-circular recess in the embossment and an annular flange portion on the other end for receipt in the annular groove in the embossment, forcing the sleeve member into the embossment to cause the annular flange portion on the sleeve member to be snapped into the annular groove in the embossment and the non-circular flange portion on the sleeve member to be received within the non-circular recess in the embossment, such embossment also having an axially and radially inwardly extending annular lip overlying the annular flange portion on the sleeve member when thus assembled within the embossment, and inserting a plug within the sleeve member to establish sealed engagement between an annular shoulder on the plug and the inturned lip on the embossment.

2. The method of claim 1 wherein the sleeve member and plug are threaded for tightening of the plug in the sleeve member to cause both the sleeve member and plug to elongate to maintain a sealing tension providing a fluid seal between the annular shoulder on the plug and the inturned lip on the embossment and also between the non-circular flange portion on the sleeve member and the interior surface of the embossment.

3. The method of claim 1 wherein the entire interior surface of the metal container and embossment are lined with a protective plastic coating prior to assembly of the sleeve member within the embossment.

* * * * *